United States Patent Office 3,824,227
Patented July 16, 1974

3,824,227
DECAPEPTIDE [D-Phe]² ANALOG OF LUTEINIZING HORMONES RELEASING FACTOR AND INTERMEDIATES THEREOF
Richard W. Rees, Bryn Mawr, and Sie Yearl Chai, Philadelphia, Pa., assignors to American Home Products Corporation, New York, N.Y.
No Drawing. Filed Apr. 11, 1973, Ser. No. 350,302
Int. Cl. A61k 27/00; C07c 103/52
U.S. Cl. 260—112.5    9 Claims

ABSTRACT OF THE DISCLOSURE

[D-Phe]²-LRF, an analog of the decapeptide luteinizing hormone release factor (LRF) is described as well as its synthesis by solid phase techniques and novel intermediates formed by such synthesis. The novel decapeptide is an antagonist of LRF in vitro.

---

This invention relates to the novel decapeptide [D-Phe]²-LRF, its process of manufacture and novel intermediates formed in such synthesis.

The luteinizing hormone releasing factor (hereafter called LRF) is the decapeptide, L-(5-oxoprolyl)-L-histidyl-L-tryptophyl-L-seryl - L - tyrosyl-glycyl-L-leucyl-L-arginyl-L-prolyl-glycine amide. This decapeptide is secreted by the hypothalamus and carried to the adenohypophysis where it stimulates the release of the luteinizing hormone and the follicle stimulating hormone. The present invention concerns itself with structural modifications of LRF to devise antagonists to LRF, that is to suppress the LRF-stimulated secretion of luteinizing hormone (LH).

The novel decapeptide of the present invention is represented by the formula:

L-p-Glu-D-Phe-L-Trp-L-Ser-L-Tyr-
    Gly-L-Leu-L-Arg-L-Pro-Gly-NH₂   (I)

and its non-toxic salts. Illustrative of pharmaceutically acceptable acid addition salts are hydrochloride, hydrobromide, sulfate, phosphate, maleate, acetate, citrate, benzoate, succinate, malate, ascorbate, and the like.

Also contemplated within the scope of the present invention are intermediates of the formula:

R⁴-L-p-Glu-D-Phe-L-Trp-L-Ser(R³)-L-Tyr(R²)-
    Gly-L-Leu-L-Arg-(N^G-R¹)-L-Pro-Gly-R   (II)

R is selected from the class consisting of $NH_2$ and O-(lower)alkyl, wherein (lower)alkyl is $C_1$ through $C_6$ (e.g. methyl, ethyl, pentyl, etc.);

$N^G$ means the side chain nitrogen atoms of arginine;

R¹ is a protecting group for the $N^δ$, $N^ω$ and $N^{ω'}$ nitrogen atoms of arginine selected from the class consisting of nitro tosyl, benzyloxycarbonyl, adamantyloxycarbonyl and trityl; or R¹ is hydrogen which means there are no protecting groups on the side chain nitrogen atoms of arginine. Where the protecting group is nitro or tosyl, the protection is on either one of the $N^ω$, $N^{ω'}$ nitrogens and in the case of benzyloxycarbonyl, trityl or adamantyloxycarbonyl, the protection is on the $N^δ$ nitrogen and either one of the $N^ω$, $N^{ω'}$ nitrogen atoms. The preferred protecting group defined by R¹ is nitro;

R² is a protecting group for the phenolic hydroxyl group of tyrosine selected from the class consisting of acetyl, tosyl, benzoyl, tert-butyl, trityl, benzyl and benzyloxycarbonyl. The preferred protecting group is benzyl; or R² is hydrogen which means there is no protecting group on the phenolic hydroxy function;

R³ is a protecting group for the alcoholic hydroxyl group of serine and is selected from the class consisting of those members defined by R²; or R³ is hydrogen which means there is no protecting group on the alcoholic oxygen atom. Preferably R³ is benzyl;

R⁴ is preferably hydrogen or an α-amino protecting group.

The α-amino protecting groups contemplated by R⁴ are those known to be useful in the art in the step-wise synthesis of polypeptides. Among the classes of α-amino protecting groups covered by R⁴ are (1) acyl type protecting groups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzoyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethane protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R⁴ are selected from the class consisting of tert-butyloxycarbonyl, benzyloxycarbonyl, trityl, phthalyl, tosyl, allyloxycarbonyl, cyclopentyloxycarbonyl, tert-amyloxycarbonyl and d-isobornyloxycarbonyl.

In formula II at least one of R¹, R² or R³ is a protecting group.

A further aspect of the present invention relates to intermediates linked to a solid resin support. These intermediates are represented by the formula:

R⁵-D-Phe-L-Trp-L-Ser(R³)-L-Tyr(R²)-Gly-
    L-Leu-L-Arg(N^G-R¹)-L-Pro-Gly-A   (III)

wherein:

R⁵ is an α-amino protecting group or hydrogen (deprotected α-amino group). The α-amino protecting group is preferably tert-butyloxycarbonyl (tert-Boc) which protecting group is also preferably used for protecting the α-amino group of all amino acids added in the step-wise solid phase synthesis. However, other α-amino protecting groups may be used such as o-nitrobenzylsulfenyl, t-amyloxycarbonyl and biphenylisopropyloxycarbonyl;

"A" is an anchoring bond used in solid phase synthesis linked to a solid resin supported. "A" is selected from the class consisting of:

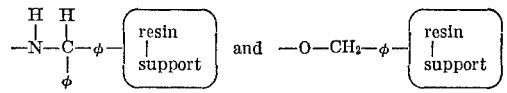

The symbol φ means "phenyl."

In selecting a particular side chain protecting group to be used in the synthesis of the peptides of formula (I), the following rules should be followed: (a) the protecting group must be stable to the reagent and under the reaction conditions selected for removing the α-amino protecting group at each step of the synthesis, (b) the protecting group must retain its protecting properties (i.e. not be split off under coupling conditions), and (c) the side chain protecting group must be removable upon the completion of the synthesis containing the desired amino acid sequence under reaction conditions that will not alter the peptide chain.

The peptides of formula (I) are prepared using solid phase synthesis. The synthesis is commenced from the C-terminal end of the peptide using an α-amino protected resin. Such a starting material can be prepared by attaching an α-amino protected glycine to a benzhydrilamine resin, a chloromethylated resin or a hydroxymethyl resin, the former being preferred. The preparation of a benzhydrilamine resin is described by P. Rivaille et al., Helv. *54*, 2772 (1971) and the preparation of the hydroxymethyl resin is described by Bodanszky et al., Chem. Ind (London) *38*, 1597–98 (1966). A chloromethylated resin is commercially available from Bio Rad Laboratories, Richmond, Calif. In using the benzhydrilamine resin an amide anchoring bond is formed with the α-amino protected glycine as follows:

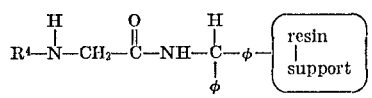

This permits the C-terminal amide function to be obtained directly after the amino acid sequence in the synthesis is complete by cleaving off the resin support to form the glycine amide at the C-terminal portion of the desired peptide of formula (I). When the other resins are used, the anchoring bond is the benzylester group as defined supra in Formula (III), which after cleavage of the peptide from the resin support must be converted to the C-terminal amide. The preferred procedure is to ammonalyse the protected peptide off the resin and then remove the protecting group by hydrogenolysis or by hydrogen fluoride cleavage. An alternate procedure would be to cleave by transesterification with methanol/$(Et)_3N$ and then convert the resulting ester into an amide and subsequently deprotect as described above. See J. M. Stewart "Solid Phase Peptide Synthesis, pg. 42–46 (W. H. Freeman & Co. 1969).

The α-amino protected glycine is coupled to the benzhydrilamine resin with the aid of a carboxyl group activating compound such as dicyclohexyl carbodiimide. Following the coupling of the α-amino protected glycine to the resin support, the α-amino protecting group is removed such as by using trifluoroacetic acid in methylene chloride, trifluoroacetic acid alone or HCl in dioxane. The deprotection is carried out at a temperature between about 0° C. and room temperature. Other standard cleaving reagents and conditions for removal of specific α-amino protecting groups may be used as described in Schroder & Lubke, "The Peptides," *1* 72–75 (Academic Press 1965). After removal of the α-amino protecting group the remaining α-amino protected amino acids are coupled step-wise in the desired order to obtain a compound of formula (I). However, as an alternate to adding each amino acid separately to the reaction, some of them may be coupled prior to addition to the solid phase reactor. If the C-terminal end of the peptide unit is represented by glycine or proline and the coupling is carried out with DCC, a minimum of racemization is encountered with proline and no problems are encountered with glycine which has no asymmetric centre. For example sequence $R^5$-Tyr ($R^2$)-glycine can be added as a unit to the reactor. Each protected amino acid or amino acid sequence, is introduced into the solid phase reactor in about a four-fold excess and the coupling is carried out in a medium of dimethylformamide: methylene chloride (1:1) or in dimethylformamide or methylene chloride alone. In cases where incomplete coupling occurred the coupling procedure is repeated before removal of the α-amino protecting group, prior to the coupling of the next amino acid to the solid phase reactor. The success of the coupling reaction at each stage of the synthesis is monitored by the ninhydrin reaction as described by E. Kaiser et al., Analyt. Biochem, *34*, 595 (1970).

After the desired amino acid sequence of Formula II has been synthesized, the peptide is removed from the resin support by treatment with a reagent such as hydrogen fluoride which not only cleaves the peptide from the resin but also cleaves all remaining side chain protecting groups and the α-amino protecting group (if present) on pyroglutamic acid to obtain directly a compound of formula I in the case where the benzhydrilamine resin was used. Where a chloromethylated resin is used the peptide may be separated from the resin by methanolysis after which the recovered product is chromatographed on silica gel and the collected fraction subjected to ammonalysis to convert the methyl ester to the C-terminal amide. Any side chain protecting group may then be cleaved as previously described or by other procedures such as catalytic reduction (e.g. Pd on C) using conditions which will keep the Trp moiety intact. When using hydrogen fluoride for cleaving, anisole is included in the reaction vessel to prevent the oxidation of labile amino acid (e.g. tryptophan).

The solid phase synthesis procedure discussed supra is well known in the art and has been essentially described by M. Monahan et al., C. R. Acad. Sci, Paris, *273*, 508 (1971).

The nomenclature used for peptides is described by Schroder & Lubke, supra, pp. viii–xxix and in Biochemistry *11*, 1726–1732 (1972).

The following examples are illustrative of the preparation of the compounds of formulas I through III.

EXAMPLE 1

L - Pyroglutamyl - D - phenylalanyl - L - tryptophyl- O - benzyl - L - seryl - O - benzyl - L - tyrosyl - glycyl- L - leucyl - $N^{guan}$ - $NO_2$ - L - arginyl - L - prolylglycyl benzhydrilamine resin Benzhydrylamine resin (25.0 g.) is put in a Merrifield vessel of 300 ml. capacity and put through the following wash cycle: (a) methylene chloride; (b) trifluoroacetic acid (3 times for 10 minutes each); (c) methylene chloride; (d) methanol; (e) triethylamine 12.5% in dimethylformamide (2 times for 10 minutes each); (f) methanol (two times); (g) methylene chloride (two times), allowing a contact time of at least 3 minutes each, if not indicated otherwise.

The resin so prepared is then gently shaken with t-butyloxycarbonyl glycine (4.0 g. or 23 mmole) in methylene chloride-dimethylformamide (1:1) while a total of 25 ml. (25 mmole) of 1m dicyclohexylcarbodiimide in methylene chloride is added in two portions over a period of 0.5 hours. Shaking is then continued at ambient temperature for a total of 18 hours. The resin is found to be substituted to the extent of about 0.4 mmoles of t-BOC-glycine per gram of resin, and negative to ninhydrine reagent, indicating complete reaction of t-BOC-glycine with all the existing amino functions of the resin.

The deprotection is carried out as follows: The resin is treated with three portions of trifluoroacetic acid for a total of 45 minutes, then step (c), (d), (e), (f) and (g) as described for the wash cycle, are performed. The sample is now strongly positive to ninhydrine reagent indicating deprotection of the glycine molecule attached to the resin.

The following amino acid residues are then introduced consecutively t-BOC-L-proline (23 mmoles, 24 mmoles DCC), t-BOC-nitro-L-arginine (23 mmoles, 24 mmoles DCC), t-BOC-L-leucine (23 mmoles, 24 mmoles DCC), t-BOC-O-benzyl-L-tyrosylglycine (20 mmoles, 20 mmoles DCC) and t-BOC-o-benzyl-L-serine (17 mmoles, 18 mmoles DCC). The t-BOC-nitro-L-arginine and t-BOC-O-benzyl-L-serine are coupled in a medium of dimethylformamide alone with the aid of dicyclohexylcarbodiimide (DCC). At this point, the resin is removed before the deblocking step, dried and weighted. The weight of the resin is 30.5 g. The synthesis is continued on half the scale (15.0 g.). After the addition of t-BOC-L-tryptophan (9.0 mmoles, 10 mmoles, DCC), the washed resin is removed and dried under vacuo for 18 hours (15.2 g.).

The resin is divided and the synthesis is continued on a 3.5 g. scale, and henceforth the deblocking is carried out in a medium of trifluoro acetic acid: methylene chloride (1:1) containing 5% 1,2-ethane dithiol.

The following amino acids are coupled to the resin in a medium of methylene chloride: dimethylformamide (1:1) with the aid of dicyclohexylcarbodiimide (DCC): t-BOC-D-phenylalanine (2.1 mmoles, 3.0 mmoles DCC), and L-2-pyrrolidone-5-carboxylic acid (2.3 mmoles, 3.0 mmoles DCC).

The washed resin is removed from the vessel and dried overnight *in vacuo* (3.8 g.).

EXAMPLE 2

L - Pyroglutamyl - D - phenylalanyl - L - tryptophyl - L-seryl - L - tyrosylglycyl - L - leucyl - L - arginyl - L - pro-pylglycinamide [(D-Phe)²-LRF]

The above described preparation obtained in Example 1 is treated *in vacuo* with liquid hydrogen fluoride (25 ml.) and anisole (4.2 ml., at ice bath temperature for 30 minutes and at room temperature for 10 minutes. The hydrogen fluoride and the anisole are then removed as quickly as possible and the remaining solids extracted with ether, 10% acetic aacid and methanol. The acetic acid extract is then lyophylized to leave 960 mg. of crude above titled product.

EXAMPLE 3

Purification and characterization of L-pyroglutamyl-D-phenyl alanyl - L - tryptophyl-L-seryl-L-tyrosylglycyl-L-leucyl-L-arginyl-L-prolylglycinamide The above titled crude product is purified and characterized as follows: 960 mg. of this product in 10 ml. of upper phase of BAW (4:1:5) (n-butanol:acetic acid: water) and applied to a BAW partition column prepared on a bed of Sephadex G-25 fine (2.6 cm. in diameter and 90 cm. in height) and eluted with upper phase. Fractions of 11 ml. each are taken. Analysis of the effluent from the column is carried out by UV absorbance at 289 mμ~ Four main peptides containing fractions (A) 16-19 (228 mg.), (B) 20-22 (323 mg.), (C) 23-25 (173 mg.) (D) 27-28 (111 mg.) are obtained. Fractions B and C (496 mg.) are shown by thin layer chromatography system BAW (4:1:1) to contain the same major material. They are combined and applied in 5 ml. of water to a column of 3.0 cm. diameter and 10 cm. heights containing carboxymethyl cellulose CM-52 (preswollen) supplied by W & R. Balstan (England) previously equilibrated with dilute acetic acid to pH 4.5. The column then is eluted with a 0-0.4 m., pH 4.5 linear aqueous ammonium acetate gradient (reservoir and mixing vessels 750 ml. each). Fractions of 11 ml. each are taken and the column effluent monitored as previously described. Three major fractions are obtained: (A) 27-33 (128 mg.), (B) 34-37 (62 mg.), (C) 38-49 (60 mg.). Fraction A is homogeneous by thin layer chromatography system BAW (4:1:1). Thin layer chromatograms are visualized with $I_2$, Pauly and Ehrlich spray.

The optical rotation is measured on a Carl Zeiss LEP A-2 photoelectric precision polarimeter, $[\alpha]_D = -42.23$ (c.=0.933 in 1% acetic acid). After hydrolysis of the peptide in 6N HCl containing 0.5% thioglycolic acid for 4 hours at 145° C. in a closed system under nitrogen, the following values for (D-Phe)²-LRF are obtained: Ser. (0.70), Glu (1.00), Pro (1.04), Gly (2.00), Leu (1.00), Tyr (0.98), Phe (1.00), $NH_3$ (0.93), Trp (0.83), Arg. (1.03).

The compound of Example 3 is tested for its ability to release luteinizing hormone (LH), prolactin (PR), and growth hormone (GH) from the pituitary and for its ability to antagonize the releasing action of LRF. These tests are performed in rat tissue cultures, using the procedure described by Grant et al., Biochemical & Biophysical Research Communications *51* pp. 100-106 (1973) and the amount of hormone released is determined by radioimmunoassay in accordance with the method described by Bernson et al., Metabolism, *13*, 1135 (1964). The results of the cell culture experiments are shown in Table 1.

TABLE I

| Experiment number | [D-Phe]²-LRF, μg./ml. | LRF, μg./ml. | Endogenous hormone | | | Hormone secreted | | |
|---|---|---|---|---|---|---|---|---|
| | | | LH | PR | GH | LH | PR | GH |
| 1 | 50 | | 334±48 | | | 349±51 | | |
| 2 | | 0.005 | 334±48 | | | 710±102 | | |
| 3 | 50 | 0.005 | 108±13 | | | 110±6 | | |
| 4 | | 0.005 | 108±13 | | | 512±12 | | |
| 5 | 1 | | 39±3 | | | 38±5 | | |
| 6 | 0.1 | | 39±3 | | | 50±6 | | |
| 7 | | 0.005 | 39±3 | | | 502±42 | | |
| 8 | 1.0 | 0.005 | 39±3 | | | 345±39 | | |
| 9 | 0.1 | 0.005 | 39±3 | | | 445±22 | | |
| 10 | 50 | | | 76±8 | | | 82±11 | |
| 11 | 50 | | | 456±57 | | | | 478±48 |
| 12 | 1 | | | 86±12 | | | 94±11 | |
| 13 | 0.1 | | | 86±12 | | | 79±9 | |

The column designated endogenous hormone means the amount of hormone which is present in the culture system without adding any agent in any given experiment (base line).

Experiments 1, 5 and 6 show no significant release of LH at the respective doses of [D-Phe]²-LRF administered whereas the controls represented by experiments 2 and 7 show substantial release of LH by LRF. This demonstrates that [D-Phe]²-LRF is unable to release LH from the culture cells and is not therefor an agonist. Experiments 3, 8 and 9 show no release or a diminished release of LH by a given dose of LRF when administered simultaneously with the indicated amount of

[D-Phe]²-LRF.

This demonstrates the antagonistic activity of

[D-Phe]²-LRF to LRF. As can be seen from experiments 10, 12 and 13, no release or inhibition of prolactin is encountered by administration of [D-Phe]²-LRF. In experiment 11, it is shown that the release or inhibition of growth hormone is unaffected by administration of [D-Phe]²-LRF.

The compound of formula I is administered to mammals intraveneously or subcutaneously for treatment of infertility and ovulation regulation and control since LH is known to trigger ovulation in mammals [See Schally et al., Am. J. Obstet. Gynecol. pp. 423-442, Oct. 1972]. A suitable formulation is represented by a physiological saline solution containing the compound of formula I administered in a dose range of between 0.01 to 5.0 mg./kg. of body weight.

What is claimed is:
1. A compound selected from the group consisting of

L-p-Glu-D-Phe-L-Trp-L-Ser-L-Tyr-Gly-L-Leu-L-Arg-L-Pro-Gly-$NH_2$ and $R^4$-L-p-Glu-D-Phe-L-Trp-L-Ser($R^3$)-L-Tyr($R^2$)-Gly-L-Leu-L-Arg-($N^G$-$R^1$)-L-Pro-Gly-R and its non-toxic salts; wherein R is selected from the class consisting of $NH_2$, OH and O-(lower) alkyl; $R^1$ is a protecting group for the $N^\delta$, $N^\omega$ and $N^{\omega'}$ nitrogen atoms of arginine selected from the class consisting of nitro, tosyl, benzyloxycarbonyl, adamantyloxycarbonyl and trityl; or $R^1$ is hydrogen; $R^2$ is a protecting group for the phenolic hydroxyl group of tyrosine selected from the class of acetyl, tosyl, benzoyl, *tert*-butyl, trityl, benzyl and benzyloxycarbonyl or $R^2$ is hydrogen;

$R^3$ is a protecting group for the alcoholic hydroxyl group of serine and is selected from the class consisting of acetyl, tosyl, benzoyl, *tert*-butyl, trityl, benzyl and benzyloxycarbonyl; or $R^3$ is hydrogen;

$R^4$ is selected from the class consisting of hydrogen or an α-amino protection group, with the proviso that at least one of $R^1$, $R^2$ and $R^3$ is a protecting group.

2. A compound according to claim 1 wherein R in $NH_2$,

3. A compound according to claim 1 wherein R is $NH_2$, $R^1$ is nitro, $R^2$ is benzyl, $R^3$ is benzyl and $R^4$ is hydrogen.

4. A compound according to claim 1 which is selected from: L-Pyroglutamyl - D - phenylalanyl - L - tryptophyl-L-seryl-L-tyrosylglycyl - L - leucyl - L - arginyl - L - prolyl - glycinamide and its nontoxic acid addition salts.

5. A compound of the formula:

$R^5$-D-Phe-L-Trp-Ser($R^3$)-L-Tyr($R^2$)-Gly-
L-Leu-L-Arg(NG-$R^1$)-L-Pro-Gly-A wherein:

$R^1$ is a protecting group for the $N^δ$, $N^ω$ and $N^{ω'}$ nitrogen atoms of arginine selected from the class consisting of nitro, tosyl, benzyloxycarbonyl, adamantyloxycarbonyl and trityl; or $R^1$ is hydrogen;

$R^2$ is a protecting group for the phenolic hydroxyl group of tyrosine selected from the class consisting of acetyl, tosyl, benzoyl, *tert*-butyl, trityl, benzyl and benzyloxycarbonyl or $R^2$ is hydrogen;

$R^3$ is a protecting group for the alcoholic hydroxyl group of serine and is selected from the class consisting of acetyl, tosyl, benzoyl, *tert*-butyl, trityl, benzyl and benzyloxycarbonyl; or $R^3$ is hydrogen;

$R^5$ is selected from the class consisting of an α-amino protecting group or hydrogen; and A is selected from the class consisting of

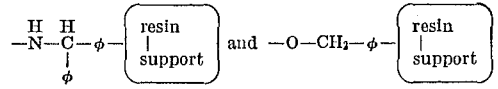

said resin support being a copolymer of styrene and divinylbenzene.

6. A compound according to claim 5 wherein $R^5$ is an α-amino protecting group which is selected from the class consisting of *tert* - butylyoxycarbonyl, o-nitrophenylsulfenyl, *tert* - amyloxycarbonyl and biphenylisopropyloxycarbonyl.

7. A compound according to claim 6 wherein A is a benzhydrilamine resin.

8. A compound according to claim 7 wherein the α-amino protecting group is *tert*-butyloxycarbonyl.

9. A compound according to claim 8 wherein $R^1$ is nitro and $R^2$ and $R^3$ are benzyl.

References Cited

Baba et al.: J. Biol. Chem., *246*, 7581–5 (1971).

Coy et al.: J. Med. Chem., *16*, 83–4 (1973).

LEWIS GOTTS, Primary Examiner

R. J. SUYAT, Assistant Examiner

U.S. Cl. X.R.

424—177